(12) United States Patent
Trail

(10) Patent No.: US 10,152,121 B2
(45) Date of Patent: Dec. 11, 2018

(54) EYE TRACKING THROUGH ILLUMINATION BY HEAD-MOUNTED DISPLAYS

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 438 days.

(21) Appl. No.: 14/989,376

(22) Filed: Jan. 6, 2016

(65) Prior Publication Data

US 2017/0192499 A1    Jul. 6, 2017

(51) Int. Cl.
| | | |
|---|---|---|
| *G06F 3/01* | (2006.01) | |
| *G02B 27/01* | (2006.01) | |
| *G02B 5/18* | (2006.01) | |
| *G02B 27/00* | (2006.01) | |
| *G06F 3/00* | (2006.01) | |
| *H04N 5/33* | (2006.01) | |

(52) U.S. Cl.
CPC .......... *G06F 3/013* (2013.01); *G02B 5/1814* (2013.01); *G02B 27/0093* (2013.01); *G02B 27/0172* (2013.01); *G06F 3/005* (2013.01); *H04N 5/332* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 2013/0285885 | A1* | 10/2013 | Nowatzyk | G02B 3/0006 345/8 |
| 2013/0286053 | A1* | 10/2013 | Fleck | G09G 3/3208 345/690 |
| 2014/0327750 | A1* | 11/2014 | Malachowsky | H04N 5/232 348/61 |
| 2016/0026253 | A1* | 1/2016 | Bradski | G02B 27/225 345/8 |

* cited by examiner

*Primary Examiner* — Jennifer Mehmood
*Assistant Examiner* — Parul H Gupta
(74) *Attorney, Agent, or Firm* — Fenwick & West LLP

(57) ABSTRACT

A head-mounted display (HMD) presents content for viewing by users. The HMD includes a display element, an optics block, and a camera. The display element includes content pixels for providing light corresponding to the displayed content and one or more tracking pixels for providing tracking light used for tracking the user's eye movements. The optics block directs light from the display element (light corresponding to the displayed content and that of tracking light) to an exit pupil of the HMD. The camera captures one or images of an eye of the user in response to projecting tracking light on the eye, where the one or more captured images include a distortion of the projected tracking light and are used in determining an orientation of the eye at a time of capturing the one or more images of the eye.

19 Claims, 4 Drawing Sheets

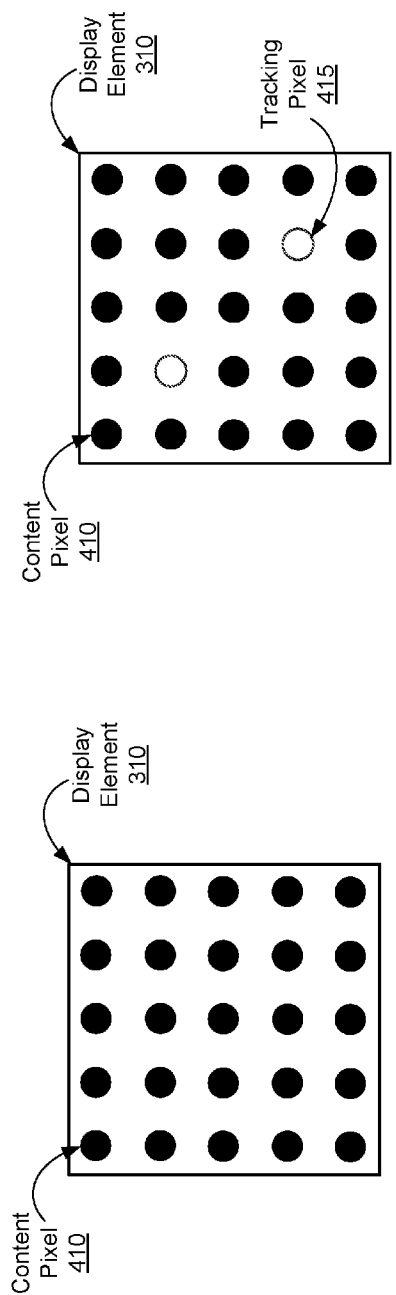
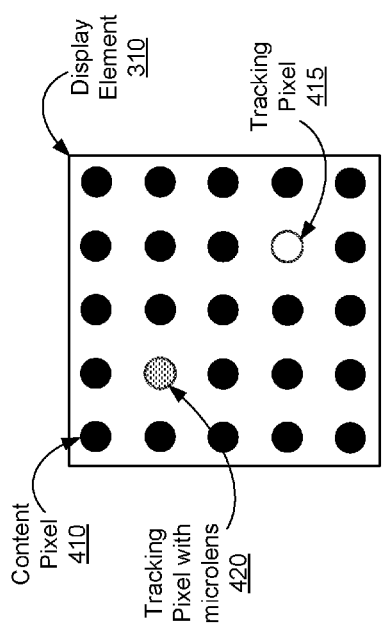

EYE TRACKING THROUGH ILLUMINATION BY HEAD-MOUNTED DISPLAYS

BACKGROUND

The present disclosure generally relates to head-mounted displays (HMDs), and specifically to HMDs that include tracking pixels.

HMDs may be used to present augmented and/or virtual information to a user. For example, a virtual reality (VR) headset can be used to simulate virtual environments. Eye tracking is an important feature for HMD systems. Conventionally active eye tracking uses controlled illumination sources that are not part of a display of an HMD and are positioned to emit light toward one or both eyes of a user of the HMD. The illumination sources increase size requirements and/or complexity of HMDs including active eye tracking.

SUMMARY

A head-mounted display (HMD) presents content for viewing by users. The HMD includes a display element, an optics block, and an eye tracking unit. The display element includes content pixels for providing light corresponding to the displayed content and one or more tracking pixels for providing illumination used for tracking the user's eye movements. In some embodiments, the pixels utilized for tracking light are also utilized to display content. The optics block directs light from the display element (light corresponding to the displayed content and that of tracking features) to an exit pupil of the HMD. The eye tracking unit includes a camera, one or more tracking pixels, and a controller. The camera captures one or more images of an eye of the user in response to projected tracking light on the eye, where the one or more captured images include an illuminated profile of the eye, and optionally due to structure in the illumination, a distortion of the projected tracking light(s) through triangulation, which are used in determining an orientation of the eye at the time of image capture.

The display element includes content pixels as well as one or more tracking pixels. The content pixels display image light corresponding to the displayed content on the display element. The one or more tracking pixels display tracking light, or illumination, used for determining an eye orientation while the user is viewing content displayed on the display element. The tracking light may include light in infrared (IR) band (~750 to 2,200 nanometers), visible band (~380 nm to 750 nm), or some combination thereof.

In some embodiments, the one or more tracking pixels emit light in the IR band. The tracking pixels emitting IR light may be turned on during all times of a time period in a given image frame. For example, when content is displayed on the display element at a refresh rate of 90 Hz, each image frame has a time period of about 11 msec. The tracking pixels emitting IR light may be turned on during the whole 11 ms time period of the image frame including the potentially shorter time period, for example 3 ms, where the content pixels are turned on for displaying image light. This is effectively up to a 100% duty-cycle. However, in instances where the illumination signal is potentially nearing or exceeding eye safety limits at higher duty-cycles, the apparent blur in the image is undesirable, or to decrease potential stray-light, the tracking pixels can operate at a smaller fraction of the display refresh time (for example 1 msec, versus the full duty-cycle of 11 msec). In these embodiments, the tracking pixels are implemented as pixels that are separate from the content pixels.

In some embodiments, the one or more tracking pixels emit light in the visible band. The tracking pixels emitting visible light may be turned on certain time periods of the image frame when the content pixels are not displaying image light. For example, for the image frame with a 11 msec time period, the content pixels are turned on for about 3 msec (content time period). The tracking pixels may be turned during the full or just a fraction of the other 8 ms portion of the image frame time period. As an example, the tracking pixels may be turned on for a period of time that could begin immediately after the end of the content time period or that ends immediately prior to the beginning of the content time period.

In some embodiments, the tracking pixels are implemented as pixels that are separate from the content pixels. In such embodiments when tracking light is light in visible band, the tracking pixels are turned on for a period of time that either begins immediately after the end of the content time period or that ends immediately prior to the beginning of the content time period.

Alternatively, the tracking pixels are implemented in the same pixels as that of the content pixels such that the tracking pixels can emit both the content (image) light as well as the tracking light. In such embodiments, the tracking pixels emit image light during the content time period and emit tracking light immediately after and/or immediately before the content time period. This allows the tracking pixels, in conjunction with the eye tracking unit to capture tracking information at least at the display refresh rate, and potentially at multiples of that. Consistent with this embodiment, the tracking pixels utilized can be chosen based upon the previous or future image scene irradiance presented to the user, to minimize any potential for the user to notice the operations, as a flicker or stray light source.

In some embodiments, the one or more tracking pixels are designed to emit structured light patterns. Structured light represents a known pattern (often grids, dots, or horizontal bars) that is projected on a surface and the pattern appears to be deformed when viewing the surface at a different angle. When structured light is on an eye, through triangulation or the inherent geometry relationship between the illumination and recording camera, the distorted illumination pattern is indicative of the 3D structure of that portion of the surface of the eye. Example structured light patterns include: a dot matrix pattern, a single line pattern, a sinusoid pattern, a multi (spatial) tone pattern, and a grid pattern.

In one embodiment, structured light is generated using a microlens that is coupled to a tracking pixel. The microlens may include one or more elements that convert light emitted from the tracking pixel to structured light. The microlens element may include, e.g., a phase and/or amplitude mask, a diffraction grating, some other element that generates structured light, or some combination thereof.

The tracking pixels may be positioned at known locations on the display element such that the tracking pixels are still transmitted in a controlled fashion to the exit pupil of the HMD and therefore part of the visible area of display for the user. The tracking pixels may also be positioned throughout the display element such that any portion of the display element being viewed by the user includes at least two tracking pixels. For example, tracking pixels may be positioned 45 degrees apart or at least one tracking pixel per quadrant of the display element, so as to provide control over the angle of illumination that impinges on the exit pupil of the HMD. This can aid eye tracking through 'shape by illumination' techniques, or by avoiding shadow effects if the user is directing the eye gaze at a corner of the display, for instance. In addition, tracking pixels may be more tightly spaced throughout the display area, especially if utilized as normal display pixels otherwise, which provides a finer degree of freedom to both choose the tracking pixel (one or more at a time) to operate, to avoid notice of the user for that operation, and to refine the potential geometry of the baseline (as each tracking pixel will have a slightly different geometrical aspect and triangulation to the otherwise stationary camera unit) if utilizing structured illumination.

The controller performs the data processing involved in controlling the tracking pixels and/or performing optical actions such as determining an orientation of the eye. The controller is coupled to the tracking pixels and the camera. The controller controls the tracking pixels to emit illumination (either quasi-uniform or structured light) and to illuminate a portion of the eye or the full exit pupil of the HMD using the emitted quasi-uniform or structured light. The camera captures the illumination profile and pattern contrast on the eye located within the eyebox region, alternatively defined as the apparent exit pupil of the HMD.

By detecting the deformation of the structured illumination pattern (if utilized) on the surface of the eye, the controller can determine the contrast profile and shape of the portion of the eye scanned. The captured light pattern is then indicative of the 3D shape of the illuminated portion of the eye. By deriving the 3D shape of the portion of the eye illuminated by the tracking pixels, the orientation of the eye can be derived. The controller may also estimate the pupillary axis, the translation of the eye, the torsion of the eye, and the current shape of the eye based on the image of the illumination pattern captured by the camera.

BRIEF DESCRIPTION OF THE DRAWINGS

FIG. 4A depicts a display with content pixels designed to emit both image light and tracking light, in accordance with an embodiment.

FIG. 4B depicts a display with tracking pixels separate from content pixels, in accordance with an embodiment.

FIG. 4C depicts a display with at least some tracking pixels including a microlens, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
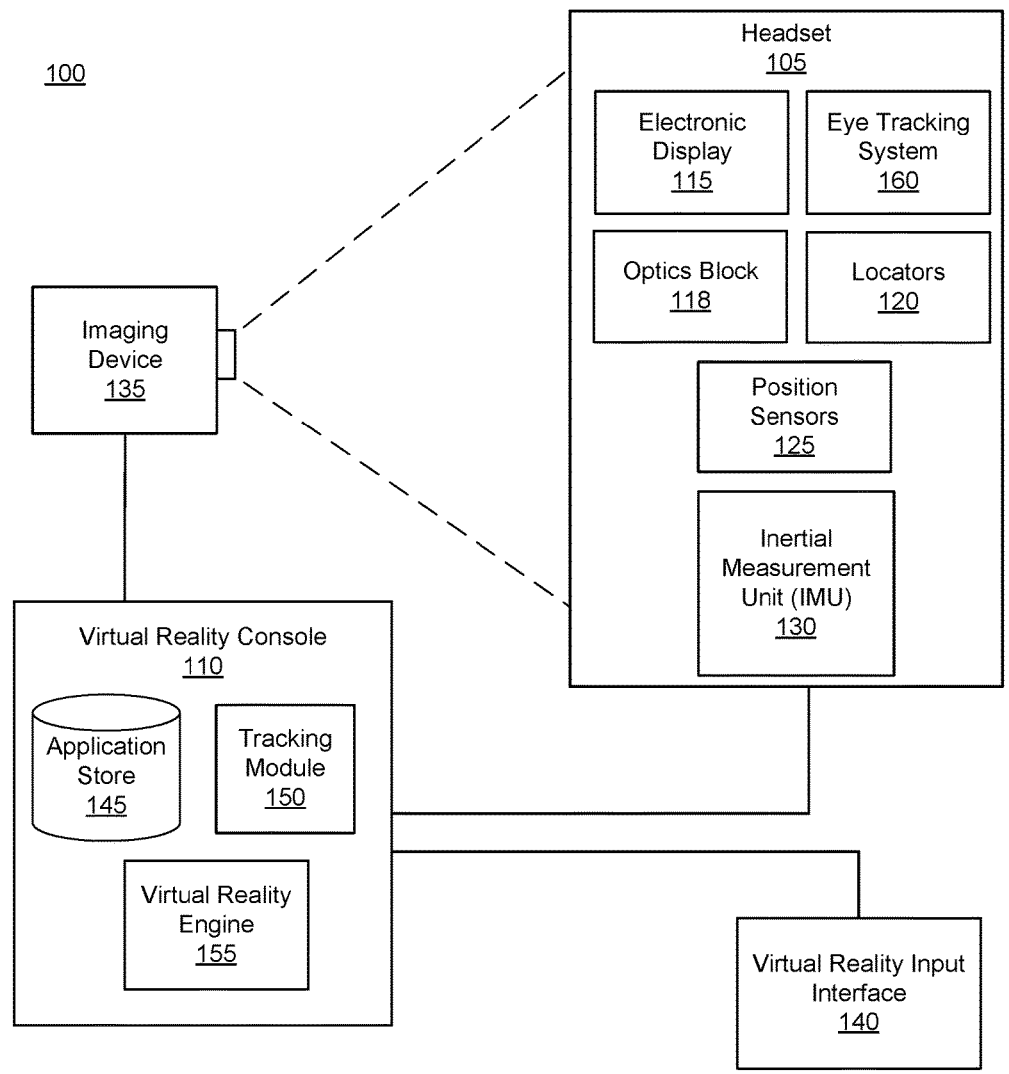
FIG. 1 is a block diagram of a system environment including a VR system, in accordance with an embodiment.

FIG. 1 is a block diagram of a VR system environment in which a VR console 110 operates. In this example, the VR system environment includes a headset 105, an imaging device 135, and a VR input interface 140, which are each coupled to a VR console 110. While FIG. 1 shows a single headset 105, a single imaging device 135, and a single VR input interface 140, in other embodiments, any number of these components may be included in the system. For example, there may be multiple headsets 105 each having an associated VR input interface 140 and being monitored by one or more imaging devices 135, with each headset 105, VR input interface 140, and imaging devices 135 communicating with VR console 110. In alternative configurations, different and/or additional components may also be included in the VR system environment. While system environment of FIG. 1 is described in a VR context, the system environment of FIG. 1 may also be part of other HMD systems such as, for example, an augmented reality (AR) or mixed reality (MR) system environment.

The headset 105 is a Head-Mounted Display (HMD) that presents content to a user. Example content includes images, video, audio, or some combination thereof. Audio content may be presented via a separate device (e.g., speakers and/or headphones) external to the headset 105 that receives audio information from the headset 105, the VR console 110, or both. The headset 105 includes an electronic display 115, an optics block 118, one or more locators 120, position sensors 125, an internal measurement unit (IMU) 130, and an eye tracking system 160. In some embodiments, the headset 105 may act as a VR headset or an AR headset.

While the headset 105 is described in FIG. 1 in a VR context as part of a VR system environment, the headset 105 may also be part of other HMD systems such as, for example, an AR system environment. In embodiments that describe AR system environment, the headset 105 augments views of a physical, real-world environment with computer-generated elements (e.g., images, video, sound, etc.). An embodiment of the headset 105 is further described below in conjunction with FIGS. 2 and 3. The headset 105 may include one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The electronic display 115 presents content to the user in accordance with data received from the VR console 110 and tracking light for tracking the user's eye movements. In various embodiments, the electronic display 115 may include a single electronic display element or multiple electronic display elements (e.g., a display for each eye of a user). Examples of an electronic display element include: a liquid crystal display (LCD), an organic light emitting diode (OLED) display, an active-matrix organic light-emitting diode display (AMOLED), some other display, or some combination thereof.

The electronic display 115 includes a plurality of pixels including content pixels for displaying content to the user and one or more tracking pixels for providing tracking light used in eye tracking. The content pixels are designed to emit visible light. For example, a content pixel emits light in at least a fraction of the visible band (~380 nm to 750 nm) which is presented to a user. The tracking pixels may be designed to emit light in at least a fraction of the visible band (~380 nm to 750 nm), in the IR band (~750 nm to 2,200 nm), or some combination thereof. For example, the tracking pixels could operate and present "red" light (~580 to 680 nm) to the user, and could therefore operate as "red" pixels for displaying content in addition to the tracking function. As an alternative example, the tracking pixels could operate in the 800 to 950 nanometer range, to be a discrete function co-located, yet dispersed throughout the electronic display 115. In some embodiments, one or more of the tracking pixels may emit tracking light in the IR concurrent with the content pixels the content pixels emitting light. In some embodiments, where the tracking pixels emit visible light, the tracking pixels and the content pixels may be designed such that the tracking pixels emit tracking light during a time period within an image frame that the content pixels are turned off and are not displaying content to the user. The tracking pixels and their operation is further described below in conjunction with FIG. 3.

The optics block 118 magnifies light received from the tracking electronic display 115, corrects optical errors associated with the image light, and the corrected image light is presented to a user of the headset 105. The optics block 118 may include one or more optical elements. An optical element may be an aperture, a Fresnel lens, a convex lens, a concave lens, a filter, or any other suitable optical element that affects the image light emitted from the tracking electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the tracking electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view.

The optics block 118 may be designed to correct optical errors, such as: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, chromatic aberration, field curvature, astigmatism, or any other type of three-dimensional optical error. In some embodiments, content provided to the tracking electronic display 115 for display is pre-distorted, and the optics block 118 corrects the distortion when it receives image light from the tracking electronic display 115 generated based on the content.

The locators 120 are objects located in specific positions on the headset 105 relative to one another and relative to a specific reference point on the headset 105. A locator 120 may be a light emitting diode (LED), a corner cube reflector, a reflective marker, a type of light source that contrasts with an environment in which the headset 105 operates, or some combination thereof. In embodiments where the locators 120 are active (i.e., an LED or other type of light emitting device), the locators 120 may emit light in the visible band (~380 nm to 750 nm), in the IR band (~750 nm to 2,200 nm), in the ultraviolet band (200 nm to 380 nm), some other portion of the electromagnetic spectrum, or some combination thereof.

In some embodiments, the locators 120 are located beneath an outer surface of the headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the headset 105 relative to an initial position of the headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the headset 105 from the sampled data. For example, the IMU 130 integrates the measurement signals received from the accelerometers over time to estimate a velocity vector and integrates the velocity vector over time to determine an estimated position of a reference point on the headset 105. Alternatively, the IMU 130 provides the sampled measurement signals to the VR console 110, which determines the fast calibration data. The reference point is a point that may be used to describe the position of the headset 105. While the reference point may generally be defined as a point in space; however, in practice the reference point is defined as a point within the headset 105 (e.g., a center of the IMU 130).

The IMU 130 receives one or more calibration parameters from the VR console 110. As further discussed below, the one or more calibration parameters are used to maintain tracking of the headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracking system 160 tracks orientation of an eye of the user to determine where the user is looking. The eye tracking system 160 includes an eye tracking unit and a controller. The eye tracking unit is located within the headset 105 and includes, among other components, one or more cameras. The eye tracking system 160 is coupled to the one or more cameras and the electronic display 115. As discussed in detail below, the eye tracking system 160 instructs the electronic display 115 to activate one or more tracking pixels. The one or more cameras captures images of one or both eyes that include light from the one or more tracking pixels. The eye tracking system 160 determines eye orientation using the captured one or more images.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the headset 105 for presentation to the user in accordance with information received from one or more of: the imaging device 135, the headset 105, and the VR input interface 140. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the headset 105, the VR interface device 140, or the eye tracking system 160. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the headset 105. For example, the tracking module 150 adjusts the focus of the imaging device 135 to obtain a more accurate position for observed locators on the headset 105. Moreover, calibration performed by the tracking module 150 also accounts for information received from the IMU 130. Additionally, if tracking of the headset 105 is lost (e.g., the imaging device 135 loses line of sight of at least a threshold number of the locators 120), the tracking module 140 re-calibrates some or the entire system environment 100.

The tracking module 150 tracks movements of the headset 105 using slow calibration information from the imaging device 135. The tracking module 150 determines positions of a reference point of the headset 105 using observed locators from the slow calibration information and a model of the headset 105. The tracking module 150 also determines positions of a reference point of the headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the headset 105 to the VR engine 155.

The VR engine 155 executes applications within the system environment 100 and receives position information, acceleration information, velocity information, predicted future positions, or some combination thereof of the headset 105 from the tracking module 150. Based on the received information, the VR engine 155 determines content to provide to the headset 105 for presentation to the user. For example, if the received information indicates that the user has looked to the left, the VR engine 155 generates content for the headset 105 that mirrors the user's movement in a virtual environment. Similarly, if information received from the eye tracking unit 160 indicates the user gazing on a location, the VR engine 155 generates content based on the identified gazing location, such as a visual representation of the scene at the gazing location with an original display resolution and surrounding scenes with a reduced display resolution. Additionally, the VR engine 155 performs an action within an application executing on the VR console 110 in response to an action request received from the VR input interface 140 and provides feedback to the user that the action was performed. The provided feedback may be visual or audible feedback via the headset 105 or haptic feedback via the VR input interface 140.

Figure 2:
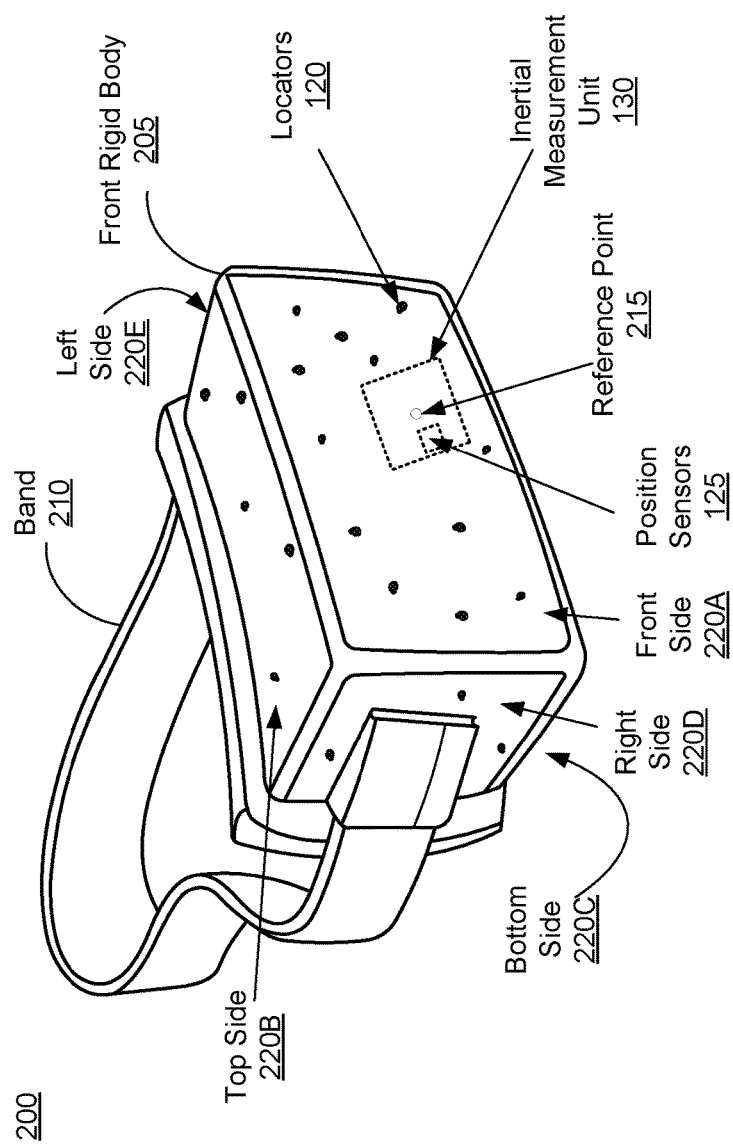
FIG. 2 is a diagram of a VR headset, in accordance with an embodiment.

FIG. 2 is a diagram of a VR headset, in accordance with an embodiment. The VR headset 200 is an embodiment of the headset 105, and includes a front rigid body 205 and a band 210. The front rigid body 205 includes the tracking electronic display 115 (not shown in FIG. 2), the IMU 130, the one or more position sensors 125, and the locators 120. In the embodiment shown by FIG. 2, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2.

Head-Mounted Displays with Tracking Pixels

Figure 3:
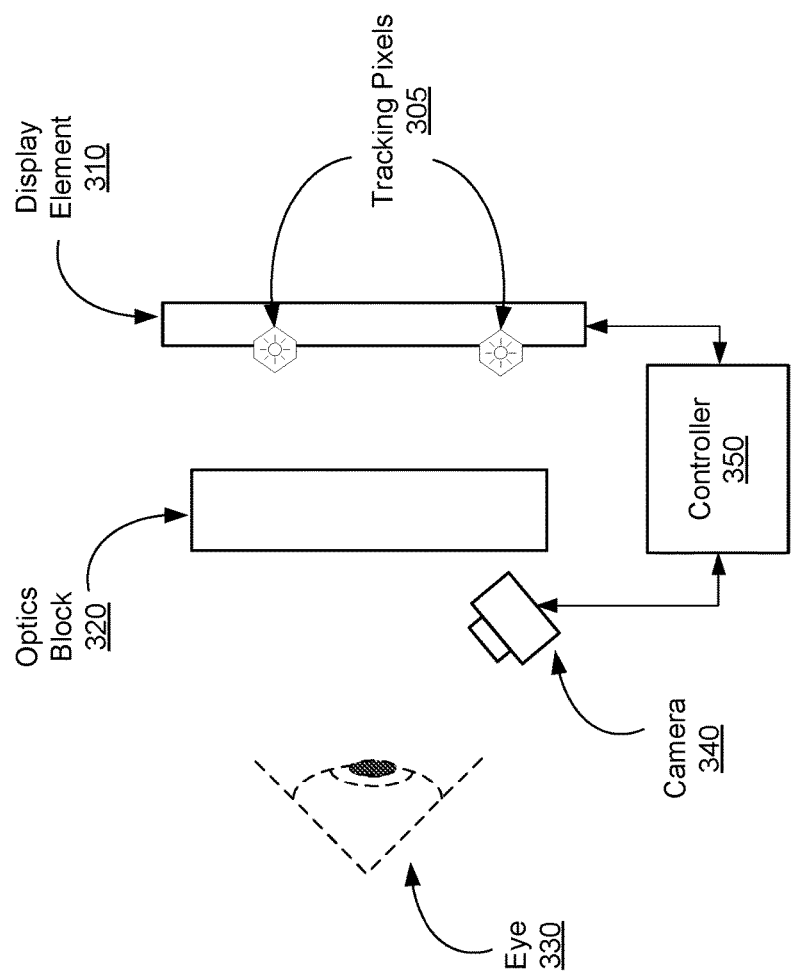
FIG. 3 depicts an optical block of a HMD including a display with tracking pixels, in accordance with an embodiment.

FIG. 3 depicts an optical block of a HMD including a display with tracking pixels, in accordance with an embodiment. FIG. 3 shows a display element 310 that displays content for viewing by an eye 330 of a user, an optics block 320, one or more tracking pixels 305, a camera 340, and a controller 350. For purposes of illustration, FIG. 3 shows components of the headset 105 associated with a single eye 330, but the headset 105 may include another display element 310 along with another set of the tracking pixels 305, the optics block 320, and the camera 340. In such embodiments a single controller 350 may control the display element 310 and the camera 340.

The optics block 320 is substantially similar to the optics block 118 discussed above in conjunction with FIG. 1. The structure of the optics block 320 may be different from that of the optics block 118 depending on the HMD application. For example, the optics block 320 is opaque in a VR application but is transparent in an AR application.

The display element 310 emits light corresponding to content being displayed (i.e., image light) as well as tracking light toward the optics block 320. The optics block 320 magnifies the image light and the tracking light, and in some embodiments, also corrects for one or more additional optical errors (e.g., distortion, astigmatism, etc.). The optics block 320 directs the image light and the tracking light to an exit pupil for presentation to the user, where the exit pupil is a location of the HMD where the user's eye is positioned.

The display element 310 includes content pixels (not shown in FIG. 3) as well as one or more tracking pixels 305. The content pixels display image light (usually broken into red, green, and blue components to achieve full-color reproduction) corresponding to the displayed content on the display element 310. The one or more tracking pixels 305 display tracking light used for determining an eye orientation while the user is viewing content displayed on the display element 310.

In some embodiments, the one or more tracking pixels 305 emit light in the IR band. The tracking pixels 305 emitting IR light may be turned on for a fraction or during all times of a time period in a given image frame. For example, when content is displayed on the display element 310 at a refresh rate of 90 Hz, each image frame has a time period of about 11 ms. The tracking pixels 305 emitting IR light may be turned on during the whole 11 ms time period of the image frame including a time period of about 3 ms when the content pixels are turned on for displaying image light as IR light is not visible to human eyes. As another example, the tracking pixels 305 could be set to expose at a fractional duty-cycle, such as 1 msec "ON" followed by 1 msec "OFF" repeated independent of the display refresh rate. In these embodiments, the tracking pixels are implemented as pixels that are separate from the content pixels.

In some embodiments, the one or more tracking pixels 305 emit light in the visible band. The tracking pixels 305 emitting visible light may be turned on for certain time periods of the image frame when the content pixels are not displaying image light. For example, for the image frame with 11 ms time period (equivalently 90 Hz), the content pixels could be operated for about 3 ms ('low persistence' mode for reducing negative VR side-effects), which is referred to herein as "content time period." The tracking pixels 305 may be utilized for some fraction during the other 9 ms portion of the image frame time period. As an example, if the content time period is between 5 ms and 8 ms portion of the image frame time period, the tracking pixels 305 may be turned on for a period of time that either begins immediately after the end of the content time period (i.e., at 8 ms time point) or that ends immediately prior to the beginning of the content time period (i.e., 5 ms time point), or both periods (to provide effectively double the display refresh rate). If the tracking pixel 305 time period is 0.5 ms, the tracking pixels 305 may be turned on from 8 ms to 8.5 ms and/or from 4.5 ms to 5 ms. When utilizing tracking pixels 305 that operate in the visible domain there is the risk that the user could notice the higher persistence or apparent "flicker". To help offset this, the tracking pixels 305 could also be utilized for displaying content (content pixels), and then the power emitted by the pixels is slightly reduced to account for the longer duty-cycle. This ensures that total power is conserved for the pixels acting as content or content and tracking functions, so that the total power over the content time of 3 msec, and the extra 0.5 to 1.0 msec, from the example above, is consistent with what would have otherwise been delivered during just the content time of 3 msec. This operates with either uniform, quasi-uniform, or structured light output from the tracking pixels, because the eye pupil simply integrates the total incident power no matter the apparent distribution within. However, this requires that the structured light pattern, if any, is well sampled over the pupil diameter as a function of the exposure time. Assuming the pattern is fixed, this would put a maximum spatial period on the pattern, approximately 1 mm for a minimum 2 mm pupil as an example. That can be further increased, although it would eventually start to reduce the resolution and illumination signal uniformity factor, by operating multiple patterns by either changing the structured light for the utilized tracking pixel 305, or utilizing multiple tracking pixels 305 which may have different static patterns available (as distributed on different portions across the display element 310.

In some embodiments, the tracking pixels 305 are implemented as pixels that are separate from the content pixels. That is, the tracking pixels 305 are not designed to emit image light but only tracking light. In such embodiments when tracking light is light in visible band, the tracking pixels 305 are turned on for a period of time that either begins immediately after the end of the content time period or that ends immediately prior to the beginning of the content time period.

Alternatively, the tracking pixels 305 are implemented in the same pixels as that of the content pixels such that the tracking pixels 305 can emit both the image light as well as the tracking light. In such embodiments, the tracking pixels 305 emit image light during the content time period and emit tracking light immediately after and/or immediately before the content time period.

In one embodiment, the one or more tracking pixels 305 include tracking pixels emitting light of different wavelengths. For example, the display element 310 includes two tracking pixels that emit visible light of different wavelengths, IR light of different wavelengths (such as 850 nm and 940 nm as an example), or some combination thereof.

In some embodiments, the one or more tracking pixels 305 are designed to emit structured light patterns. Structured light represents a known pattern (often grids or horizontal bars) that is projected on a surface and the resulting image or video of the pattern deforms based upon the triangulation or baseline offset from the emitting source and camera geometry, which allows the camera 340 to calculate the depth and structural information of the surface. When structured light is illuminated on an eye, the distorted illumination pattern is indicative of the 3D structure of the imaged portion of the surface of the eye. Example structured light patterns include: a repeating or pseudo-random dot matrix pattern, a single line pattern, a sinusoid pattern, a multi-tone pattern, and a grid pattern. For example, a sinusoidal pattern may be generated by mating the tracking pixels 305 with a birefringent crystal/plastic or other media that would act as a shearing interferometer which is then orientated between two polarizers (assuming an unpolarized tracking pixel 305). This allows the single source to appear to have a coherent virtual source which can create a sinusoidal interference pattern in the output intensity distribution from the source. As an example, this shearing effect can be created through a Savart plate crystal covering the display, placed appropriately in relation to the set of linear polarizers, by utilizing an engineered stack of polarizer films, or through a diffractive optical element (DOE) all placed on top of the desired pixel elements.

As an alternative example, the structured light pattern may also be a barcode like structured light projected across the exit pupil (to be incident on the user's eye 330). This structured light pattern may be structured light that covers the full eye 330 as a one-dimensional pattern.

In one embodiment, a tracking pixel 305 may include a microlens (e.g., microlens of tracking pixel 420), where the microlens passes tracking light originating from the tracking pixel 305. The microlens may be affixed directly to the tracking pixel 305. In some embodiments, the microlens may be fabricated as part of the display element 310. The microlens is positioned relative to the display element 310 such that for a single microlens, the microlens receives light from a single corresponding pixel. The microlens is a net positive lens that may concentrate the emission distribution of the tracking light emitted by the tracking pixel 305, and generally aims the emission at the exit pupil of the HMD. In one embodiment, a subset of the one or more tracking pixels 305 (i.e., not all tracking pixels 305) are affixed with microlenses as shown in FIG. 4C below, which can be different as based upon the position of the tracking pixel relative to the display origin.

In one embodiment, the microlens may include an optical element that when illuminated by a light source (e.g., IR and/or visible) outputs structured light. Such an optical element may include, e.g., an apodization and/or phase mask, a diffractive element such as a DOE, plastic polarizer stack, birefrigent plate, some other optical element that when illuminated by the light source output structured light. Additionally, in some embodiments, the light source may be modulated in time, frequency, or both.

In one embodiment, the microlens element includes a phase and/or amplitude mask for controlling the phase and/or amplitude of the tracking light passing through the microlens. For example, the phase mask may direct the tracking light towards a particular direction and the amplitude mask may direct a certain intensity of tracking light towards the particular direction.

In one embodiment, the microlens element includes a diffraction grating configured to provide a structured light for use by the camera 340 while tracking the user's eye movements. A diffraction grating is an optical component with a periodic structure, which splits and diffracts light into several beams travelling in different directions. The direction of these beams depends on the spacing of the grating and the wavelength of the light so that the grating acts as the dispersive element. The diffraction grating may be designed to provide a pattern with diffractive effects that may assist the camera 340 while tracking the user's eye movements, such as generating a series of bars or dots in a desired orientation and pattern across the exit pupil of the HMD.

The one or more tracking pixels 305 are positioned at known locations on the display element 310. In one embodiment, the one or more tracking pixels 305 are positioned throughout the display element 310 such that at least one content pixel is positioned in between two tracking pixels. For example, a first tracking pixel and a second tracking pixel are positioned such that at least one content pixel is positioned in between the first tracking pixel and the second tracking pixel. In another example, the one or more tracking pixels 305 are positioned such that the separation between consecutive tracking pixels is at least 50% of a diagonal dimension of the display element 310. In other embodiments, the consecutive tracking pixels may be separated by different amounts of the diagonal dimension or another dimension (e.g., horizontal dimension) of the display element 310.

Alternatively or additionally, the tracking pixels 305 may be positioned on the display element 310 such that a relationship between the positioning of the one or more tracking pixels 305 and the display element comprising at least one of: positioning within an outer quarter area of the display element, positioning within one quadrant of the display element, and positioning of at least one tracking pixel in each quadrant of the display element 310. In one embodiment, the tracking pixels 305 could be grouped near the edge of the display, so as to minimize any potential reduction in resolution in a region more likely to be directly in line with the users gaze direction. In some embodiments, the tracking pixels 305 could operate in multiple wavelength bands, such as having some pixels in the visible (within any color channel representative of the display architecture) and some in the infrared (for instance at 850 nm). In this manner, the eye tracking module can select which sources are most beneficial for the tracking accuracy without impacting the user's experience. For example, the IR tracking pixels 305 can be utilized asynchronously with the display, but depending on the scene content, the visible pixels can only be operated at a lower duty-cycle or lower signal-to-noise ratio. The benefit of multiple wavelengths being operated based upon the scene/user engagement allows a broader and richer data set, which can extract different geometry (based upon placement within the display) and color (such as red, green, blue, or infrared image signals) information.

FIGS. 4A-4C depict a display with different combinations of the tracking pixels and content pixels. FIG. 4A shows a display with content pixels that are designed to emit both image light and tracking light. FIG. 4A shows display element 310 and content pixels 410. At least some of the content pixels 410 are designed to also emit tracking light in addition to the image light. In this embodiment, tracking light is in the visible band.

FIG. 4B shows a display with tracking pixels separate from content pixels. FIG. 4B shows display element 310, content pixels 410, and tracking pixels 415. The tracking pixels 415 are separate and different from that of the content pixels 410. Accordingly, the tracking light emitted by the tracking pixels 415 can be light in IR band, visible band, or some combination thereof.

FIG. 4C shows a display with at least some tracking pixels including a microlens, which can all be identical or vary as a function of tracking pixel location on the display. FIG. 4C shows display element 310, content pixels 410, tracking pixels 415 that do not include a microlens, and tracking pixels 420 that include a microlens. The tracking pixels 420 are separate and different from that of the content pixels 410 as well as that of tracking pixels 415 that do not include a microlens. Tracking pixels 420 include a microlens and/or other optical elements, as discussed above in conjunction with FIG. 3, that generate a structured light output pattern. The tracking light emitted by the tracking pixels 415 as well as tracking pixels 420 can be light in IR band, visible band, or some combination thereof. In addition, these tracking pixels 415 or tracking pixels with optical elements 420 can also be utilized to display content, if operated in the appropriate visible channel (one of red, greed, or blue traditionally).

Referring back to FIG. 3, the camera 340 captures images of the eye while the eye is viewing content displayed on the display element 310 as well as reflections of the tracking light. When the tracking light is a structured light pattern, the camera 340 detects the distorted light pattern on the portion of the eye illuminated by the one or more tracking pixels 305. The camera 340 may be an IR camera (i.e., a camera designed to capture images in the IR frequency), a near-IR camera, or a visible light camera with digital image sensors sensitive to the bandwidth of light emitted by the tracking pixels 305. The camera 340 includes a CCD, CMOS, or similar CCD-CMOS hybrid digital image sensor and an optical element. The optical element may be one or more lenses, a high-pass, low-pass, or band-pass filter, a polarizer, an aperture stop, a diaphragm, some other optical element suitable for processing IR light, visible light, or some combination thereof. The optical element transmits light which is captured and converted into a digital signal by the CCD/CMOS digital sensor.

The camera 340 may be positioned, as shown in FIG. 3, off-axis relative to an axis of content being displayed on the display element 310. Alternatively, the camera 340 may be positioned within the display element 310 such that the camera is on-axis. While FIG. 3 shows a single camera 340 detecting the orientation of a single eye 330, in alternate embodiments, multiple cameras 320 may be employed for a single eye.

The controller 350 performs the data processing involved in controlling the tracking pixels 305 and/or performing optical actions such as determining an orientation of the eye. The controller 350 is coupled to the tracking pixels 305 and the camera 340. The controller 350 may perform eye tracking by focusing the camera 340 on one or both of the user's eyes 330 and records their movements as the user looks at the content displayed on the display element 310. For example, the controller controls the tracking pixels such that a structured light pattern projects onto the shape of the eye. In response to such structured light projection, a perceived distortion in the structured light pattern results when viewed from an offset angle. The camera 340 detects the distortions (if any) of the light pattern projected onto the eye.

In one embodiment, the controller 350 estimates, for a given eye of the user, the orientation of the eye. The controller 350 controls the tracking pixels 350 to emit structured light and to illuminate a portion of the eye using the emitted structured light. The camera 340, oriented on a different axis than that of the tracking pixels 310, captures the illumination pattern on the eye. By detecting the deformation of the illumination pattern on the surface of the eye, the controller 350 can determine the shape of the portion of the eye scanned. The captured distorted light pattern is therefore indicative of the 3D shape of the illuminated portion of the eye. By deriving the 3D shape of the portion of the eye illuminated by the tracking pixels, the orientation of the eye can be derived. The controller 350 may also estimate the pupillary axis, the translation of the eye, the torsion of the eye, and the current shape of the eye based on the image of the illumination pattern captured by the camera 340.

As the orientation may be determined for both eyes of the user, the controller 350 is able to determine where the user is looking. The HMD may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
a display element configured to display content to a user wearing the headset, the display element comprising a plurality of pixels including one or more tracking pixels and a plurality of content pixels, the one or more tracking pixels configured to provide tracking light and the plurality of content pixels configured to provide light corresponding to the displayed content, wherein the plurality of content pixels are further configured to provide the light corresponding to the displayed content during a first time period of an image frame, the first time period different from a second time period of the image frame when the one or more tracking pixels are configured to provide the tracking light;
an optics block configured to direct light from the display element to an exit pupil of the headset; and
a camera configured to capture one or more images of an eye of the user in response to projecting the tracking light on the eye, the one or more captured images comprising a distortion of the projected tracking light and used in determining an orientation of the eye at a time of capturing the one or more images of the eye.

2. The headset of claim 1, wherein the tracking light provided by the one or more tracking pixels is a structured light.

3. The headset of claim 1, wherein the tracking light provided by the one or more tracking pixels is infrared light.

4. The headset of claim 1, wherein the tracking light provided by the one or more tracking pixels is visible light.

5. The headset of claim 1, wherein at least one tracking pixel of the one or more tracking pixels is further configured to provide light corresponding to the displayed content.

6. The headset of claim 5, wherein the at least one tracking pixel provides light corresponding to the displayed content during the first time period of an image frame, and the second time period includes a time period comprising at least one of: a time period before a beginning of the first time period and a time period after an end of the first time period.

7. The headset of claim 1, wherein at least one of the one or more tracking pixels comprises a microlens configured to pass the tracking light originating from the at least one tracking pixel, the microlens affixed to the at least one tracking pixel.

8. The headset of claim 7, wherein the microlens comprises an element, the element configured to generate a structured light.

9. The headset of claim 8, wherein the microlens element is a phase mask or an amplitude mask.

10. The headset of claim 8, wherein the microlens element is a diffraction grating.

11. The headset of claim 1, wherein the one or more tracking pixels comprise two or more tracking pixels, wherein at least one tracking pixel is configured to provide infrared light (700 to 2,220 nanometers) and at least one tracking pixel is configured to provide visible light.

12. The headset of claim 11, wherein the at least one tracking pixel configured to provide visible light is further configured to provide light corresponding to the displayed content.

13. The headset of claim 1, wherein the one or more tracking pixels comprise two or more tracking pixels configured to provide the tracking light at two different wavelengths.

14. The headset of claim 1, wherein the one or more tracking pixels comprise a first tracking pixel and a second tracking pixel, the first tracking pixel and the second tracking pixel positioned such that at least one content pixel is positioned in between the first tracking pixel and the second tracking pixel.

15. The headset of claim 1, wherein the one or more tracking pixels are positioned on the display element such that a relationship between the positioning of the one or more tracking pixels and the display element comprising at least one of: positioned within an outer quarter area of the display element, positioned within one quadrant of the display element, and at least one tracking pixel is positioned in each quadrant of the display element.

16. The headset of claim 1, further comprising:
a controller configured to control the one or more tracking pixels for projecting the tracking light and to determine the orientation of the eye.

17. A headset comprising:
a display element configured to display content to a user wearing the headset, the display element comprising a plurality of pixels including one or more tracking pixels and a plurality of content pixels, the one or more tracking pixels configured to provide tracking light and the plurality of content pixels configured to provide light corresponding to the displayed content, wherein the plurality of content pixels are further configured to provide the light corresponding to the displayed content during a first time period of an image frame, the first time period different from a second time period of the image frame when the one or more tracking pixels are configured to provide the tracking light;
an optics block configured to direct light from the display element to an exit pupil of the headset;
a camera configured to capture one or more images of an eye of the user in response to projecting the tracking light on the eye, the one or more captured images comprising a distortion of the projected tracking light and used in determining an orientation of the eye at a time of capturing the one or more images of the eye; and
a controller configured to control the one or more tracking pixels for projecting the tracking light.

18. The headset of claim 17, wherein the controller is further configured to determine the orientation of the eye.

19. A headset comprising:
a display element configured to display content to a user wearing the headset, the display element comprising a plurality of pixels including one or more tracking pixels and a plurality of content pixels, the one or more tracking pixels configured to provide tracking light and the plurality of content pixels configured to provide light corresponding to the displayed content, wherein the plurality of content pixels are further configured to provide the light corresponding to the displayed content during a first time period of an image frame, the first time period different from a second time period of the image frame when the one or more tracking pixels are configured to provide the tracking light;
an optics block configured to direct light from the display element to an exit pupil of the headset;
a camera configured to capture one or more images of an eye of the user in response to projecting the tracking light on the eye, the one or more captured images comprising a distortion of the projected tracking light and used in determining an orientation of the eye at a time of capturing the one or more images of the eye; and
a controller configured to control the one or more tracking pixels for projecting the tracking light and to determine the orientation of the eye.

* * * * *